A. HUPP.
DISAPPEARING SEAT.
APPLICATION FILED JULY 3, 1915.
1,177,951.
Patented Apr. 4, 1916.
2 SHEETS—SHEET 1.
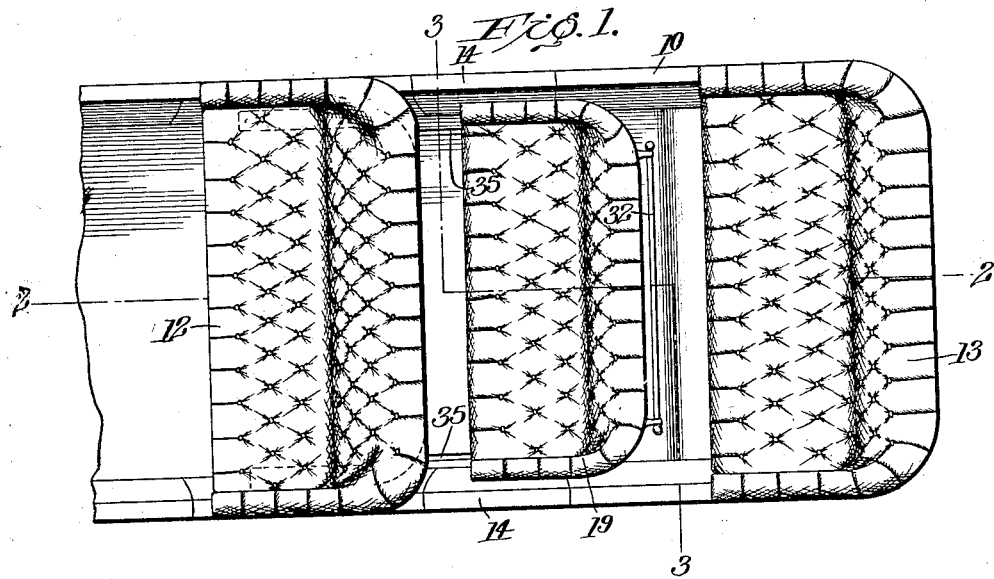
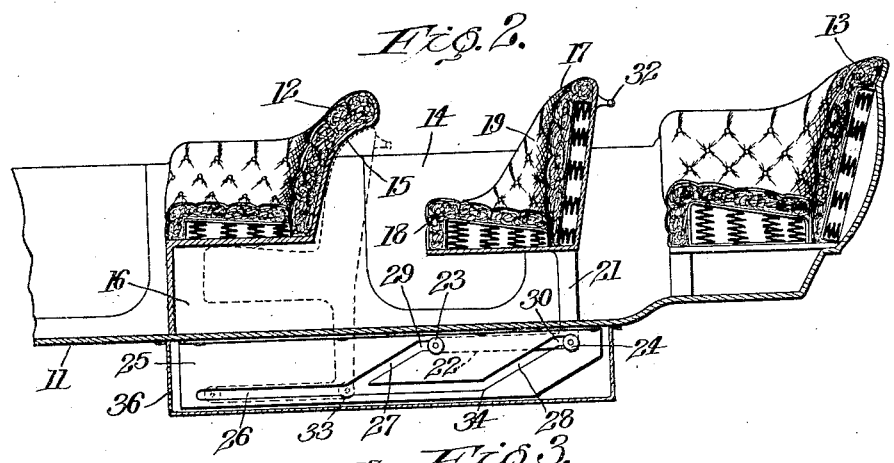
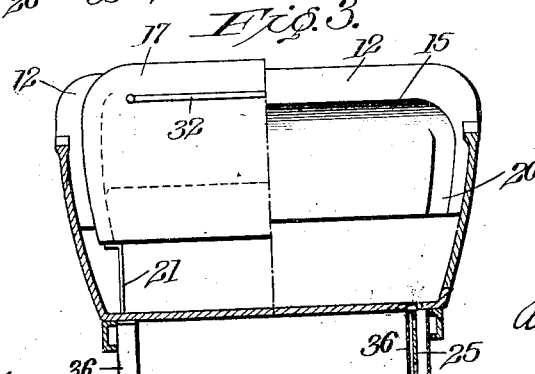
Witnesses
G. J. Baker.
B. M. Kent
Inventor
Albert Hupp
by Foster Freeman Watson & Coit
Attorneys A. HUPP.
DISAPPEARING SEAT.
APPLICATION FILED JULY 3, 1915.
1,177,951.
Patented Apr. 4, 1916.
2 SHEETS—SHEET 2.
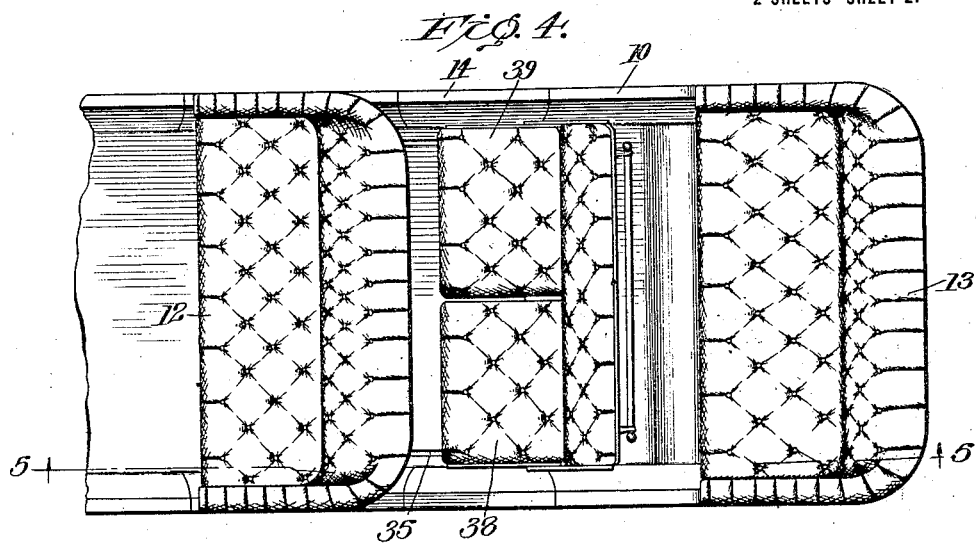
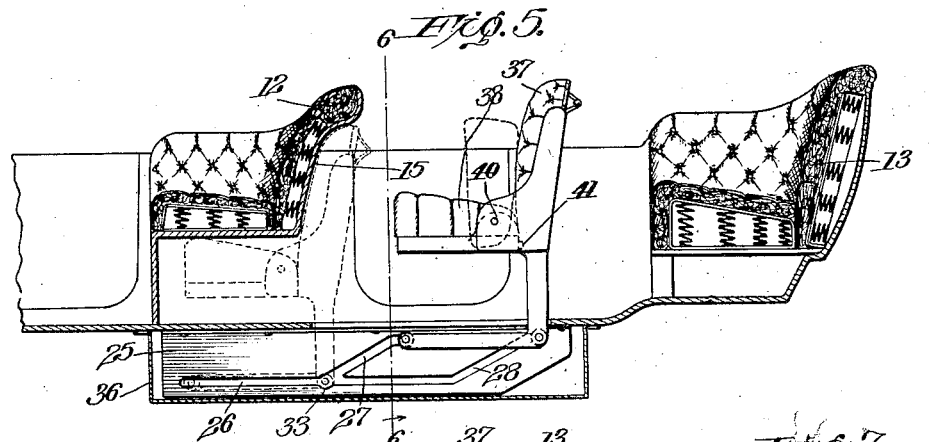
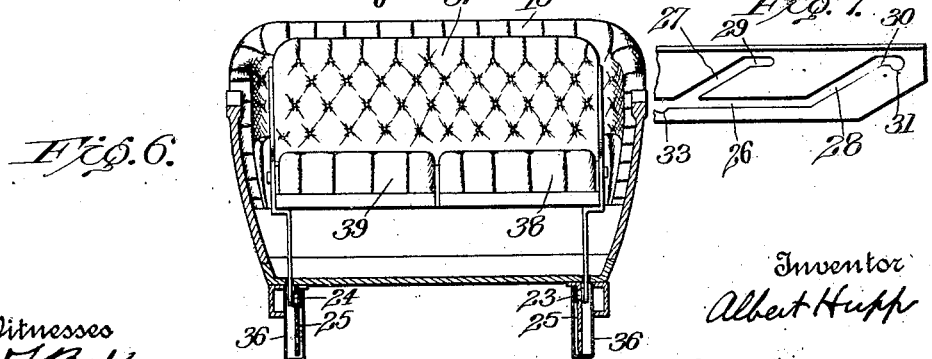
Inventor
Albert Hupp
Witnesses
G. T. Baker
B. M. Kent
by Foster Freeman Watson & Cort
Attorneys

UNITED STATES PATENT OFFICE.

ALBERT HUPP, OF WASHINGTON, DISTRICT OF COLUMBIA.

DISAPPEARING SEAT.

1,177,951.	Specification of Letters Patent.	Patented Apr. 4, 1916.

Application filed July 3, 1915. Serial No. 37,868.

*To all whom it may concern:*

Be it known that I, ALBERT HUPP, a citizen of the United States, residing at Washington, District of Columbia, have invented certain new and useful Improvements in Disappearing Seats, of which the following is a specification.

This invention relates to vehicles and more particularly to motor vehicles provided with disappearing seats.

One of the objects of the invention is to provide a disappearing seat of substantially the full width of the vehicle and having suitable upholstery to make it as comfortable as the fixed seats of the vehicle.

A further object is to provide a disappearing seat which may be housed beneath the front seat of the vehicle and readily drawn from this housed position to the seating position.

A further object is to provide a seat of the kind referred to above which may be moved from one of its positions to the other without being folded or changed in any way from its normal seating condition.

Other objects and the features of novelty will be apparent from the following description taken in connection with the accompanying drawings, in which, Figure 1 is a plan view of a portion of a vehicle body comprising my invention; Fig. 2 is a longitudinal section on the line 2—2 of Fig. 1; Fig. 3 is a transverse section on the line 3—3 of Fig. 1; Fig. 4 is a plan view of a portion of the body comprising another form of my invention; Fig. 5 is a longitudinal section on the line 5—5 of Fig. 4; Fig. 6 is a transverse section on the line 6—6 of Fig. 5; Fig. 7 is a side view of a portion of one of the seat guides and supports.

Referring to Figs. 1 to 3, 10 indicates the vehicle body having the floor 11 and the fixed transverse seats 12 and 13. The body 10 is provided with the usual side doors 14, between the seats 12 and 13, through which access is had to the seat 13 and the space between the seats. The back of the seat 12 is provided with a recess 15 and a space 16 is provided between the bottom of the seat 12 and the floor 11. A movable or disappearing seat having a back 17 and bottom 18 is adapted to fit in under the seat 12 as indicated in dotted lines in Fig. 2, the back 17 fitting the recess 15 and the bottom 18 occupying the space 16. When the disappearing seat is in the position indicated in dotted lines in Fig. 2 it so fills the recess 15 that the back of the seat 12 is given a substantially smooth and symmetrical appearance which will harmonize with the lines of the body and be pleasing to the eye. In order to make the disappearing seat substantially as comfortable as the fixed seats, it is provided with the rounded ends 19 which are adapted to enter the special recesses 20, provided therefor in the back of the seat 12.

In order to support the disappearing seat, it is provided with the legs 21 having the extensions 22 below the floor 11, the legs 21 being preferably secured to the seat beneath the back thereof. Each of the legs 21 carries two rollers 23 and 24 spaced longitudinally of the vehicle for the purpose of holding the seat in a condition of stable equilibrium. Arranged below the floor 11 and secured to the under side thereof are guides 25, each of which is provided with a substantially horizontal slot 26 having the parallel upwardly inclined extensions 27 and 28. The extensions 27 and 28 are preferably provided at their upper ends with short horizontal extensions 29 and 30, respectively, and the extension 30 has a depression 31 (see Fig. 7) which receives the roller 24 when the disappearing seat is in the position shown in full lines in Figs. 1 and 2. The weight of the seat and the occupants thereof firmly holds the roller 24 in the depression 31, and thus the disappearing seat is secured in the seating position. When it is desired to house the disappearing seat the occupant of the seat 13 pushes forward on the handle or robe rail 32, thereby lifting the roller 24 out of the depression 31 and causing the rollers 23 and 24 to follow the slots 27 and 28. The disappearing seat is thus caused to move parallel to itself or have a motion of translation and when the rollers 23 and 24 reach the horizontal slots 26 the seat will have been lowered to the level indicated in dotted lines in Fig. 2. It may then be moved forward to the position beneath the seat 12, where it nests with the latter, and is secured by the roller 24, entering a depression 33 in the slot 26. When the disappearing seat is in the housed position it is substantially forward of the doors 14, as indicated in Fig. 2, and access may be readily had to the seat 13 and the space between the seats.

When the disappearing seat is to be used, the occupants of the seat 13 will enter the vehicle first and then draw the disappearing seat rearwardly by means of the robe rail 32. When the rollers 24 strike the bottom 34 of the inclined slots 28 the rearward pull on the rail 32 will cause the rollers 23 to be thrown up into the slots 27 and further movement of the disappearing seat rearwardly causes the rollers 23 and 24 to traverse the inclined slots and assume the position shown in Fig. 2 in full lines. The persons who are to occupy the disappearing seat may then enter the vehicle and, in leaving the vehicle it will, of course, be necessary for them to leave first so as to permit the disappearing seat to be moved to the housed position.

The legs 21 extend through slots 35 and the guides 25 are suitably housed by means of the casings 36 which are secured to the under side of the floor 11 and prevent dust and air from flowing upwardly through the slots 35.

Referring to Figs. 4, 5 and 6, it will be seen that the body 10 is substantially the same as that shown in Figs. 1 to 3. The front seat 12 is provided with the recess 15 for the back 37 of the disappearing seat. In this form of the invention the disappearing seat is similar to that shown in Figs. 1 to 3 except that the bottom of the seat is arranged in sections 38 and 39 which are pivoted at 40 to the seat frame and adapted to be swung up into a substantially vertical position. The bottoms 38 and 39 are held in the substantially horizontal position shown in Fig. 5 by means of lugs 41 or other devices on the seat frame. By having the bottoms 38 and 39 adapted to be turned up independently there will be very little difficulty or inconvenience in getting into or out of the disappearing seat because when the bottoms are turned up they are no longer in front of the doors 14.

The back 37 is common to both of the bottoms 38 and 39 and extends across substantially the full width of the vehicle, thus providing a very rigid and desirable construction. If preferred, each of the bottoms 38 and 39 could be provided with a separate back and in this way two entirely separate disappearing seats would be formed and either could be used while the other remained housed beneath the front seat 12.

I have described the principles of my invention and illustrated what I now consider to be the preferred embodiments thereof, but it will be understood that the details may be varied within wide limits to suit different body constructions, without departing from the spirit of the invention as defined in the claims and I therefore do not wish to be limited to the exact construction shown and described.

Having thus described the invention, what is claimed and desired to be secured by Letters Patent is:

1. In a vehicle, the combination of a body, a fixed seat thereon, a movable seat, and fixed guides carried by said body beneath the floor thereof whereby said movable seat is guided while moving horizontally and vertically between the substantially parallel positions in the rear of the fixed seat and beneath the latter.

2. In a vehicle, the combination of a body, a fixed seat thereon, a movable seat, supporting means for said movable seat comprising extensions longitudinal of the vehicle, and fixed guides on said body beneath the floor thereof and having horizontally and vertically extending portions coöperating with said supporting means and their extensions to guide the movable seat between positions beneath said fixed seat and in the rear of the latter.

3. In a vehicle, the combination of a body, a fixed seat thereon, a movable seat having a plurality of supporting members extending beneath the floor of said body, guiding means carried by said floor and coöperating with said supporting means and whereby the movable seat is caused to have a substantially translatory motion horizontally and vertically between positions beneath said fixed seat and in the rear thereof.

4. In a vehicle, the combination of a body, a fixed seat thereon, a movable seat, supporting members for said movable seat having extensions longitudinally of the vehicle, guides carried by the floor of said body and provided with substantially horizontal slots each having a pair of parallel extensions inclined upwardly therefrom, and spaced rollers on said supporting members coöperating with said slots to guide said movable seat between positions beneath said fixed seat and in the rear thereof.

5. In a vehicle, the combination of a body, a fixed seat thereon, a movable seat, supporting members for said movable seat having extensions longitudinally of the vehicle, guides carried by the floor of said body and provided with substantially horizontal slots each having a pair of parallel extensions inclined upwardly therefrom, spaced rollers on said supporting members coöperating with said slots to guide said movable seat between positions beneath said fixed seat and in the rear thereof, and depressions in said slots adapted to coöperate with said rollers to secure said movable seat in different positions.

6. In a vehicle, the combination of a body, fixed seats thereon spaced longitudinally of the body, a movable seat having a back extending across substantially the full width of the body, and a plurality of independently movable bottoms, said movable seat having a position between said fixed seats, a door in the vehicle body forward of the back of said movable seat when the latter is in said position, and means for guiding said movable seat to a position forward of said door and beneath the forward one of said fixed seats.

7. In a vehicle, the combination of a body, guides carried by said body beneath the floor thereof, a movable seat within said body, supporting members for said movable seat, said guides each having a substantially horizontal slot provided with lateral inclined parallel branches, spaced means on each of said members adapted to engage said inclined slots to guide the seat in its movement between different positions, and a handle at the top of said seat whereby it may be moved.

In testimony whereof I affix my signature.

ALBERT HUPP.